Figure 1:
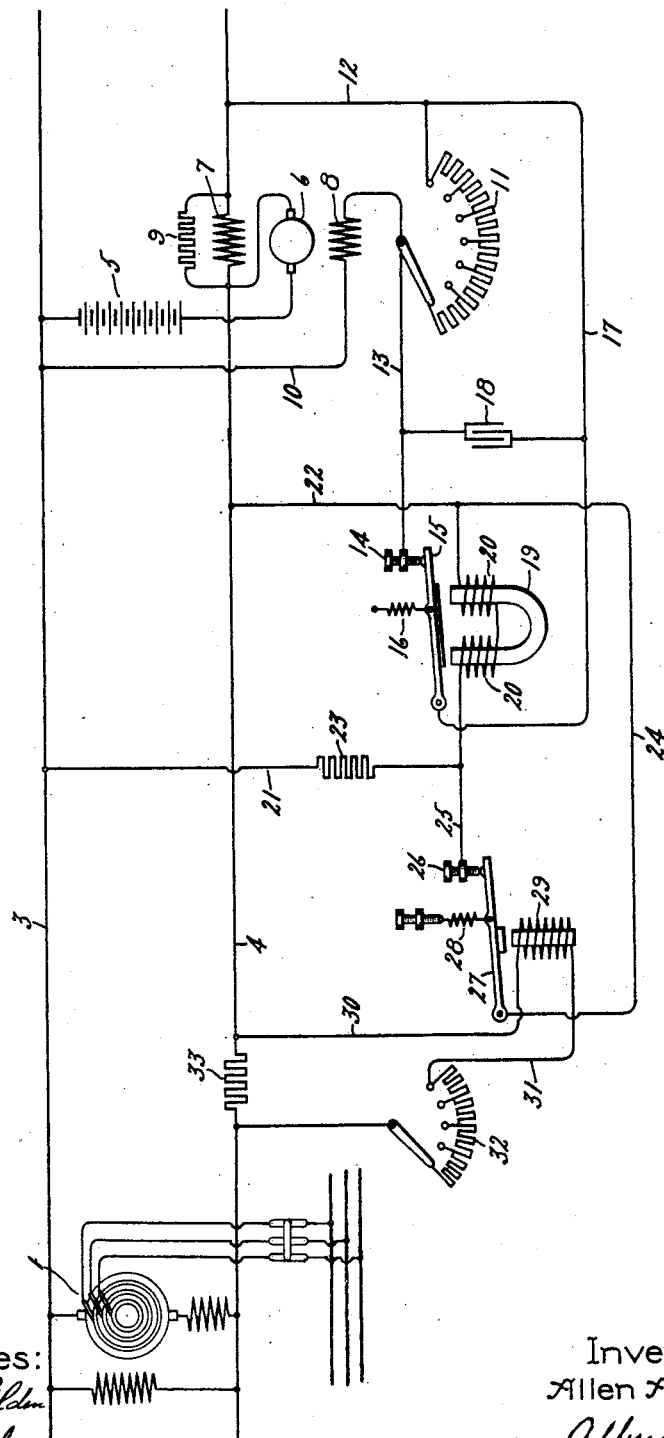

A. A. TIRRILL.
CONSTANT CURRENT REGULATOR.
APPLICATION FILED NOV. 4, 1907.

924,857.

Patented June 15, 1909.
2 SHEETS—SHEET 1.

Witnesses:
George W. Tilden
J. Ellis Glen

Inventor:
Allen A. Tirrill,
by Albert G. Davis
Att'y.

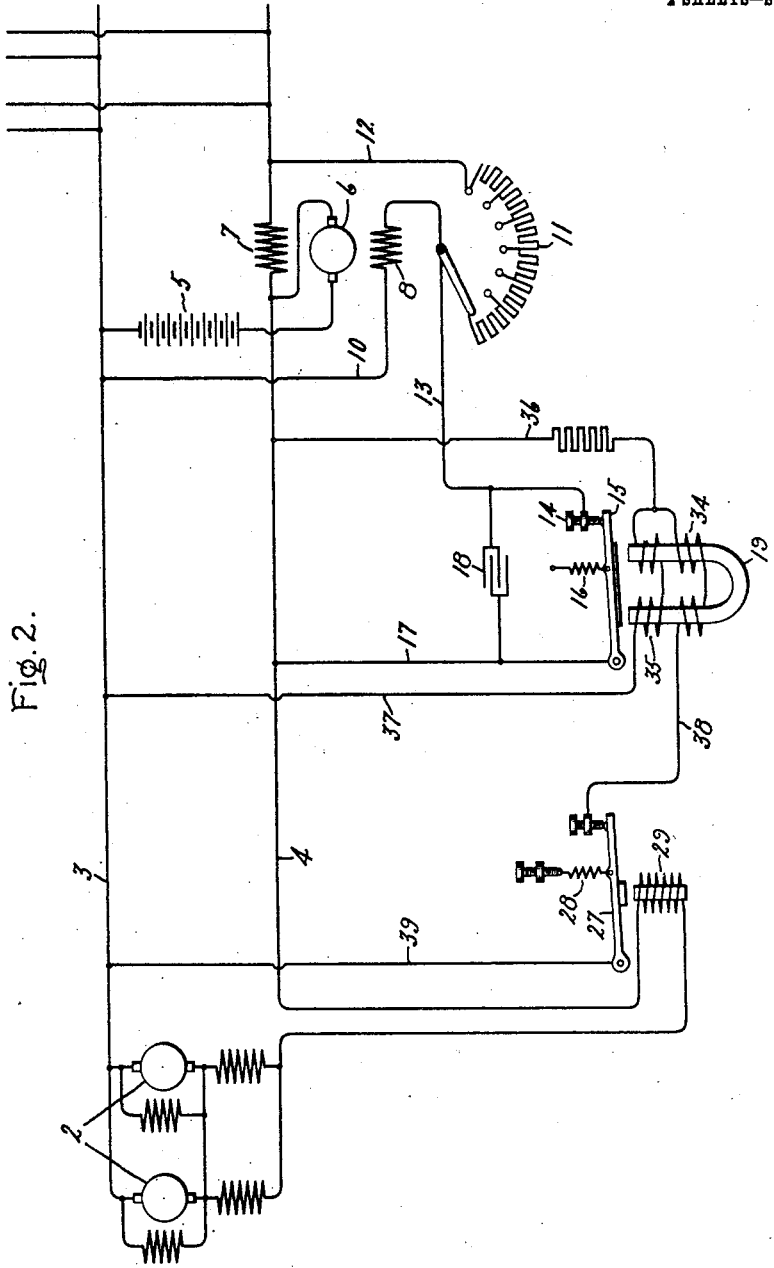

UNITED STATES PATENT OFFICE.

ALLEN A. TIRRILL, OF SCHENECTADY, NEW YORK, ASSIGNOR TO GENERAL ELECTRIC COMPANY, A CORPORATION OF NEW YORK.

CONSTANT-CURRENT REGULATOR.

No. 924,857.  Specification of Letters Patent.  Patented June 15, 1909.

Application filed November 4, 1907. Serial No. 400,461.

*To all whom it may concern:*

Be it known that I, ALLEN A. TIRRILL, a citizen of the United States, residing at Schenectady, county of Schenectady, State of New York, have invented certain new and useful Improvements in Constant-Current Regulators, of which the following is a specification.

My invention relates to regulators adapted to systems of electric distribution comprising dynamo electric machines, such as boosters, in which the voltage delivered by the machine is automatically varied in response to conditions on the system, and more particularly to systems in which a storage or secondary battery is used to equalize the load on the generator supplying the system, and a booster is connected in series with the battery to regulate its output.

Boosters and similar machines having a field coil in series with the circuit have been regulated to a certain extent by means of a differential or opposing coil connected to the circuit, usually in shunt, but if the opposing coil is proportioned to give a correct regulation within certain limits it is ineffective outside those limits, while an automatic rheostat in series with the opposing coil is either sluggish and cannot quickly respond to small variations of current or else shunts and swings back and forth through the proper position.

The object of my invention is to provide a regulator which will instantly respond to changes in the system controlled by it; which gives correct regulation at all loads; which will control a booster connected in series with a storage battery so that the battery takes its share of the load at all times without any attention from the attendant; which automatically varies the effect of an opposing or differential coil on a series booster in accordance with the load on the circuit to which the booster is connected, and which is in many particulars hereinafter pointed out an improvement on prior automatic regulators for systems of distribution.

In carrying out my invention, a dynamo electric machine or booster is provided with means, such as differential field coils, for generating opposing magnetomotive forces, one of which is varied so that the resultant of the two gives the proper magnetic flux in the field of the machine. The variation in one of the magnetomotive forces is preferably produced by some means, which will automatically vary the period of time during which the force is developed, this period being long or short in accordance with the conditions to be met by the machine. In the present construction, the field of the machine is provided with an opposing coil, and the duration of flow of current through said coil is controlled by an automatic device, such as a Tirrill regulator, which closes the circuit of the coil for a varying period of time dependent upon the conditions on the circuit to be controlled. Where my invention is embodied in a system comprising a storage or secondary battery connected to a main circuit through a booster, the booster has a series coil, and a differential coil connected in shunt across the main circuit. A Tirrill regulator responding to changes of load on the main circuit controls a shunt circuit around a resistance in series with the differential coil, so that if the load is heavy and nearly the full power of the battery and booster is required, the effect of the differential coil is decreased in proportion to the load and the battery carries a portion of the load, while if the load on the line is light, the effect of the differential coil is increased in proportion to the load, the series coil of the booster is overpowered and the booster voltage is built up in a direction to charge the battery, and the load on the rotary converters or other source of supply remains constant.

In the accompanying drawings, which show one embodiment of my invention, Figure 1 is a diagram of a system of distribution using rotary converters with a storage battery and booster to equalize the load, and Fig. 2 is a similar system supplied from generators and having a slightly different regulator.

In the accompanying drawings, the corresponding parts of the systems shown in Figs. 1 and 2 are marked with similar reference characters. In the system shown in Fig. 1, rotary converters 1, and in the system shown in Fig. 2, generators 2, supply the leads 3 and 4 of a consumption circuit.

In order to maintain a constant load on the converters and generators, a storage or secondary battery 5 is connected across the circuit in shunt with the converters and generators, and in order to control the output of the battery and to insure that it shall carry its share of the load, a booster 6 is connected in series with it. By varying the amount and direction of the voltage of the booster, the battery can either discharge into or be charged from the circuit. The necessary variations in the voltage delivered by the booster are secured by generating opposing magnetomotive forces in the field on the booster and varying one of the forces until the flux resulting from the simultaneous action of the two forces develops a voltage of the proper amount and the proper direction.

The arrangement shown in the drawings for producing the opposing magnetomotive forces consists of a field coil 7 connected in series with the circuit for producing a magnetomotive force in one direction, and an opposing or differential coil 8 connected in shunt across the circuit for producing a counter-magnetomotive force. If desired, a shunt 9 for the series field coil may be used to regulate the amount of current flowing through said coil. The series coil 7 produces a magnetomotive force in one direction varying with the amount of current in the circuit, and by varying the effect of the opposing coil 8, a flux is produced which is the resultant of the two magnetomotive forces, and causes the booster to develop the proper voltage to control the output of the storage battery.

The opposing or differential coil 8 is connected in shunt across the consumption circuit 3—4 by means of a lead 10, a hand-operated rheostat 11 in series with the coil, and a lead 12. The regulation of the effect of the differential coil may be secured by automatically and intermittently opening the circuit through the coil for longer or shorter periods of time, depending on conditions, but preferably the circuit is never entirely opened, but a resistance is inserted and removed by an automatic regulator closing a shunt circuit around the rheostat 11 to cut the entire resistance of the rheostat out of circuit with the coil 8. The shunt circuit consists of a lead 13 from the arm of the rheostat connected to a fixed contact 14 of a relay for opening and closing the circuit through the differential coil 8 by means of a pivoted armature 15 carrying a contact normally held in engagement with the fixed contact 14 by means of a spring 16, and connected to the other side of the rheostat through a lead 17.

A condenser 18 is connected in parallel with the contacts of the relay to diminish sparking. When the contacts of the relay are in engagement, the rheostat 11 is short-circuited, and the maximum current flows through the differential coil 8, which thereupon generates a maximum counter-magnetomotive force strong enough to overpower the force due to the series coil 7 and to enable the booster to charge the battery. As soon as the contacts separate, the rheostat is cut into circuit with the differential coil which thereupon receives so little current that its effect is very slight.

The armature of the relay is controlled by means of a U-shaped magnet 19 provided with windings 20 connected in shunt across the circuit through leads 21 and 22, and the former having included in it a resistance 23. The magnet is also connected to a shunt circuit consisting of a lead 25, connected to the fixed contact 26 of the regulator, and a lead 24 connected to the movable contact of the regulator through the armature 27. The armature 27 coöperating with the fixed contact 26 is held in engagement with it by means of a spring 28, and is drawn out of engagement by means of a regulator magnet 29 connected in series with the lead 4 of the consumption circuit through a lead 30, a lead 31 and a rheostat 32. The amount of current through the regulator magnet is determined by a shunt 33 connected across the same.

When the contacts of the regulator are in engagement, the magnet 19 is short-circuited and has no effect on the armature 15 of the relay, but when the contacts separate, due to the pull of the regulator magnet 29, a current due to the difference of potential across the circuit flows through the magnet 19 and moves the armature 15, thereby opening the shunt circuit around the rheostat 11 and reducing the effect of the opposing coil 8 to a minimum.

The arrangement shown in Fig. 2 is substantially the same as that shown in Fig. 1 except that a slightly different form of magnet 19 for operating the relay is used. The U-shaped magnet 19 has two opposing windings 34 and 35, both connected to the lead 4 of the consumption circuit through a lead 36 and both connected to the lead 3 of the consumption circuit, one through a lead 37, the other through the lead 38, contacts of the regulator and lead 39. Both windings are therefore connected in parallel across the circuit and neutralize each other when the circuits of both are closed. If, however, the regulator contacts separate as a result of an increase in load on the consumption circuit, the flow of current through the winding 34 ceases and the other winding 35 draws the armature 15 away from the contact 14, opening the short-circuit around the rheostat 11 and reducing the current through the opposing coil 8 to a minimum, thereby permitting the series coil to have its full effect.

The operation of the device shown in the drawings is as follows: When the load on the system is normal, the two coils generate equal and opposing magnetomotive forces, the booster generates no voltage, and the battery floats on the line. Since the load on the converters or other source of supply is continuously varying above and below the normal within very narrow limits, a regulator magnet 29 keeps the armature 27 continuously vibrating thereby intermittently opening and closing a number of times per second the shunt circuit around the resistance in series with the coil, the periods of time during which the circuit is closed being of the proper length and occurring with the proper frequency to energize the coil 8 just enough to counterbalance the series coil 7. As the load begins to increase, the effect of the series coil 7 also increases and the converters also attempt to furnish more current causing the vibrations of the armature 27 to change so that the periods during which the circuit is closed decrease in length while the intervals between the periods increase thereby lessening the effect of the differential coil 8 until the series coil causes the booster to develop the proper voltage to put a portion of the load on the battery. The tendency for the current from the converters to vary causes a corresponding variation in the vibrations of the armature 27, resulting in the change in the effect of the coil 8, so that the voltage of the booster is altered just enough to maintain a constant load on the converter. As the load on the system and the effect of the series coil 7 begins to decrease from the normal, the amount of current from the converters tends to vary and causes the regulator to vary the vibrations of the armature 27 so that the length of the periods of time during which the circuit of coil 8 is closed increases to correspond with the decrease of load while the intervals between the periods are correspondingly shortened producing just enough change in the effect of the differential coil 8 to cause the series coil 7 to develop enough voltage on the booster to charge the battery at a rate which will maintain a constant load on the converter.

It has been found that a regulator embodying my invention enables the voltage delivered by the booster to be controlled much more accurately than is the case where a rheostat is used to vary the current through the field windings of the booster, since the effect of the rheostat is determined by the number of steps of resistance, and the amount of resistance cut into the circuit of the field of the booster is rarely the exact amount required, while the necessity of quickly and accurately moving a heavy rheostat arm to various positions is avoided.

My invention may be embodied in many other forms than that shown and described, and I therefore do not wish to be restricted to the exact form shown, but intend to cover by the appended claims all changes and modifications within the spirit and scope of my invention.

What I claim as new and desire to secure by Letters Patent of the United States, is,—

1. In a system of distribution comprising a generator connected to a circuit, the combination with a secondary battery and a booster connected in series across said circuit, of a winding in series with the circuit for generating a magnetomotive force in the field of the booster, means for generating a counter-magnetomotive force in said field, and means responsive to load on the generator for varying said counter-magnetomotive force and the duration of its variations.

2. In a system of distribution comprising a generator connected to a circuit, the combination with a secondary battery and a booster connected in series across said circuit, of a field winding for the booster in series with the circuit, an opposing winding in shunt across the circuit, and means responsive to load on the generator for varying the flow of current through said opposing winding and the duration of the variations of flow.

3. In a system of distribution comprising a generator connected to a circuit, the combination with a secondary battery and a booster connected in series across said circuit, of a field winding for the booster in series with the circuit, an opposing winding in shunt across the circuit, coöperating contacts for varying the resistance of the circuit through said opposing winding, and a regulating coil in series with the generator for actuating said contacts.

4. In a system of distribution comprising a generator connected to a circuit, the combination with a secondary battery and a booster connected in series across said circuit, of a field winding for the booster in series with the circuit, an opposing winding in shunt across the circuit, a regulating resistance in series with said winding, coöperating contacts for shunting said resistance, and a regulating coil in series with the generator for controlling said contacts.

5. In a dynamo-electric machine, the combination of differential windings in the field of said machine, a resister included in the circuit of one of said windings, and means for rapidly opening and closing a shunt around said resister and for controlling the relative length of the interval during which said shunt is closed.

6. In a dynamo-generator, the combination of a series field winding for said generator, a shunt winding opposed to said series winding, a resister in series with said shunt winding, a low resistance shunt for said resister, co-acting contacts for opening and closing said low resistance shunt circuit, and a means responsive to the current in the system for controlling said contacts.

7. In combination, a dynamo-electric machine, and means for alternately applying to the field of said machine a maximum and a minimum excitation and for varying the polarity and relative duration of such maximum and minimum excitation.

8. In combination, a storage battery and its complementary booster and connections, with means for alternately applying to the field of the booster a maximum and a minimum excitation and for varying the polarity and relative duration of such maximum and minimum excitation.

In witness whereof, I have hereunto set my hand this first day of November, 1907.

ALLEN A. TIRRILL.

Witnesses:
    HELEN ORFORD,
    CHARLES MCCLAIR.